June 27, 1939.  O. H. OLSON  2,164,254
WEEDING MACHINE
Filed July 28, 1938    2 Sheets-Sheet 2
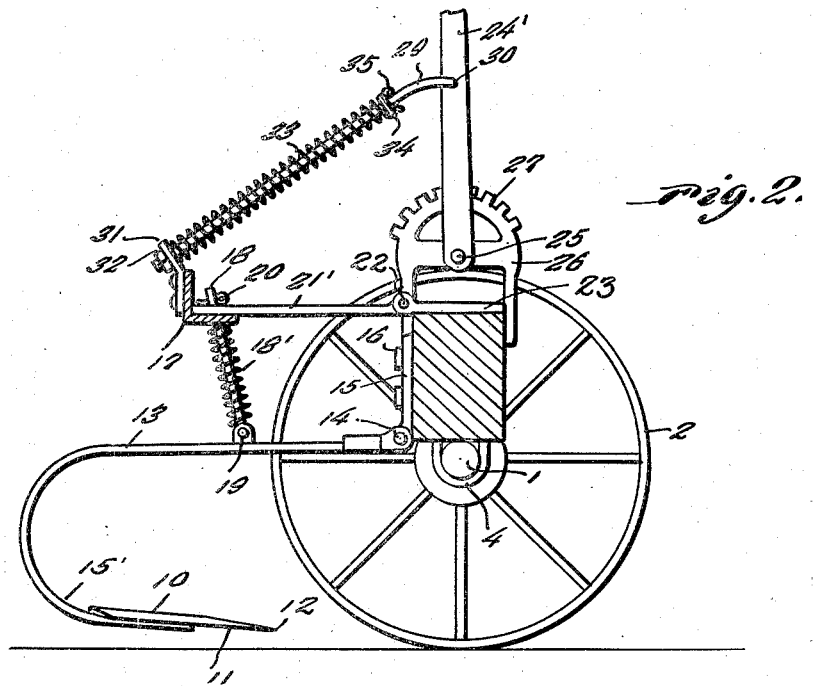
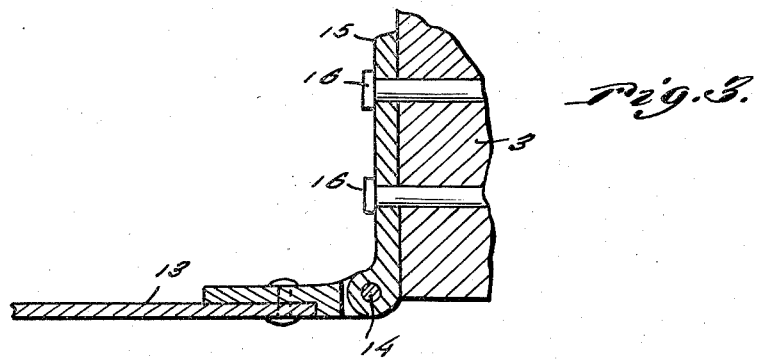
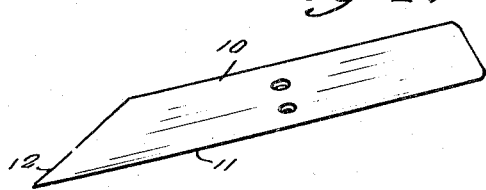
Inventor
O. H. Olson
By Clarence A. O'Brien
and Hyman Berman
Attorneys Patented June 27, 1939

2,164,254

UNITED STATES PATENT OFFICE 2,164,254

WEEDING MACHINE

Oscar H. Olson, Julesburg, Colo.

Application July 28, 1938, Serial No. 221,839

1 Claim. (Cl. 97—144.1)

My invention relates to improvements in weeding machines and the principal object in view is to provide a machine for destroying weeds while at the same time tilling and packing the soil so as to loosen the same without leaving the top soil in a condition such that erosion will occur through the action of wind and water.

To the accomplishment of the foregoing, and subordinate objects presently appearing, a preferred embodiment of my invention has been illustrated in the accompanying drawings, set forth in detail in the succeeding description, and defined in the claim appended hereto.

In said drawings:

Figure 2 is a view in transverse section taken on line 2—2 of Figure 1, looking in the direction indicated by the arrows, Figure 3 is a fragmentary view in transverse section taken on line 3—3 of Figure 1, looking in the direction indicated by the arrows, and Figure 4 is a view in perspective of one of the blades.

Figure 1:
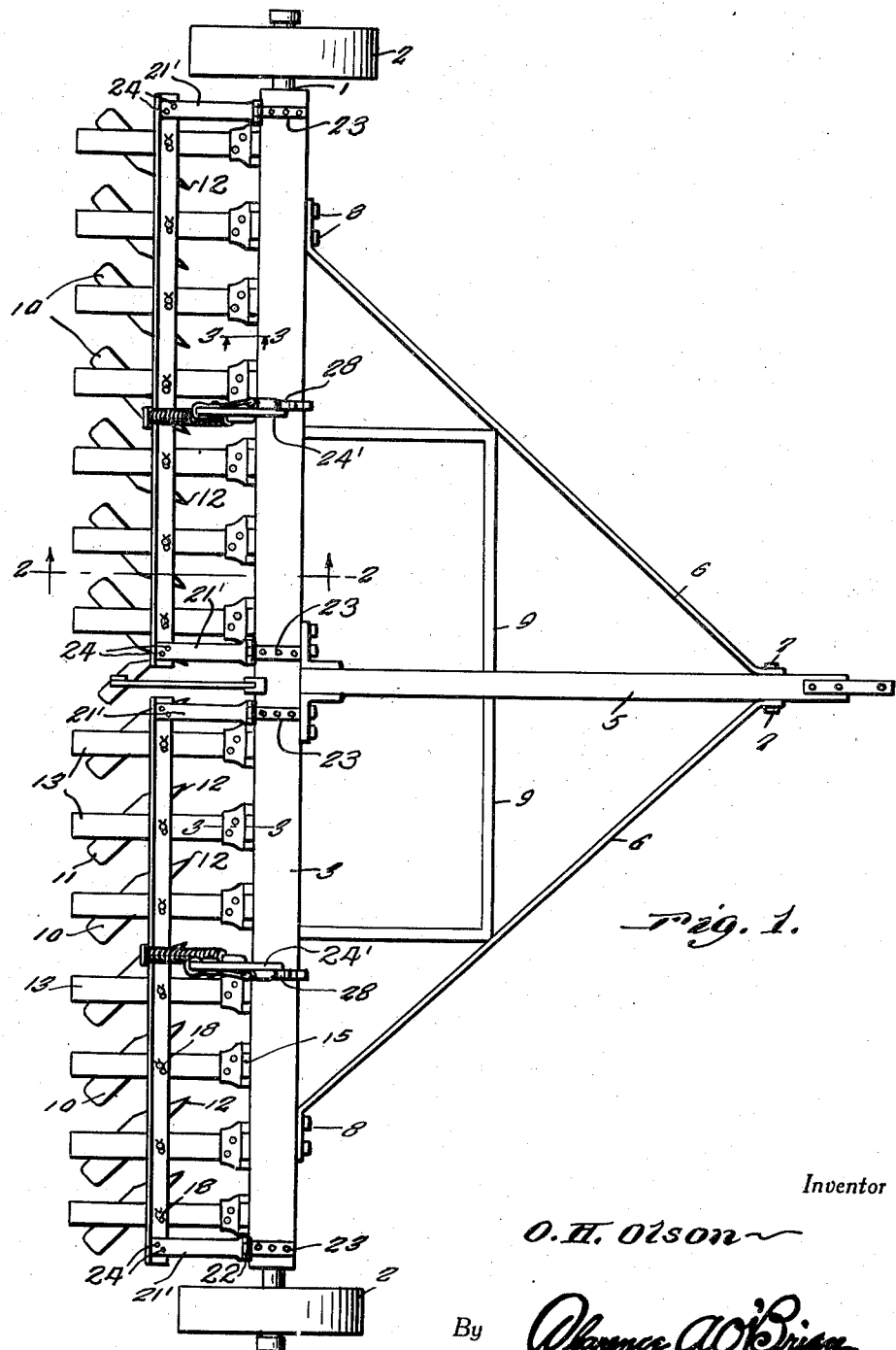
Figure 1 is a view in top plan of a weeding machine embodying my improvement.

Referring to the drawings by numerals, the machine of my invention comprises an axle 1 having journaled on the opposite ends thereof ground wheels 2, said axle supporting between the wheels 2 a heavy beam 3, preferably of wood, mounted on said axle by suitable U-bolts 4 secured to the beams in any suitable manner. Extending forwardly from the center of said beam 3 is a draft tongue 5 of any suitable type braced laterally by a pair of diagonal brace bars 6 bolted to the tongue, as at 7, upon opposite sides thereof and to the front face of said beam 3 adjacent opposite ends thereof, as at 8. Between the tongue 5 and the brace bars 6 is a pair of rightangled brace bars 9 disposed upon opposite sides of said tongue 5 and suitably connected to said tongue and to the beam 3.

In the rear of the beam 3 and upon each side of the transverse center thereof is a battery of trailing weed cutting blades 10 of elongated rectangular form and having straight front cutting edges 11 and pointed front ends 12, said blades 10 in each battery being pivotally mounted for vertical adjustment on the beam 3 in equidistantly spaced relation longitudinally of said beam. The mounting for the blades 10 comprises a flat bar 13 of metal for each blade having a front end pivoted, as at 14, to a plate 15 secured, as at 16, to the rear sides of the beam 3, said bar extending rearwardly from said beam and having a downwardly and forwardly curved rear end 15' to which the related blade 10 is suitably secured, preferably on top thereof, to extend forwardly and diagonally thereof in substantially horizontal position with the pointed front end 12 thereof foremost. The blades 10 of each battery, that is to say on opposite sides of the center of the beam 3, extend in diagonally opposite directions towards said center.

Each battery of blades 10 is independently adjustable vertically, as a unit, by means of the following: The bars 13 of each battery are connected in unitary relation by an angle iron 17 extending across the said bars 13 above the same. An upwardly extending eye bolt 18 is pivoted to each bar 13, as at 19, and has its upper end slidably extended through said angle iron 17 with a cotter pin 20 inserted therethrough. An expansion spring 21 is sleeved on each eye bolt 18 between the pivot of the latter and said angle iron 17. The angle irons 17 are mounted on the beam 3 for vertical swinging adjustment to correspondingly adjust the connected bars 13 and hence the related battery of blades 10, and by means of a pair of links 21' for each iron 17 pivoted, as at 22, to straps 23 bolted on top of the beam 3, said links extending rearwardly and the straps of each pair being bolted, as at 24, to opposite ends of the related angle irons 17.

Each angle iron 17 has associated therewith a hand lever 24' pivoted, as at 25, on a bracket 26 suitably secured to the beam 3 to extend upwardly therefrom and including a toothed detent sector 27 with which a suitable detent 28 on the lever coacts. Each lever 24' is connected to the associated angle iron 17 by means of a rod 29 having one end pivoted, as at 30, to the lever and its other end loosely extending through a clip 31 on the angle iron 17 and provided with a nut 32 threaded thereon. A cushion spring 33 is sleeved onto each rod 29 between the associated clip 31 and a washer 34 on the rod backed by a cotter pin 35.

As will now be seen, each battery of blades 10 may be adjusted vertically to cut along the surface of the ground or at any depth desired in the ground and by means of the levers 24', the rods 29 connecting the same to the angle irons 17 and the described connections between the angle irons 17 and bars 13, to wit, the eye bolts 18. It will furthermore be seen that the springs surrounding the eye bolts 18 provide for yielding independent upward movement of the bars 13 and hence the blades 10 relative to the angle irons 17 so that said blades 10 may ride over obstructions in the ground or on top thereof. Also, by virtue of the described springs 33 sleeved onto the rods 29, the angle irons 17 are permitted upward yielding movement independently to provide for further compensating movement of the blades 10 under different working conditions.

By virtue of the described arrangement of the blades 10, said blades effect a draw cut and throw the weeds, and earth, toward opposite sides of the machine as will be clear.

My invention will, it is believed, be readily understood from the foregoing without further explanation.

Manifestly the invention, as described, is susceptible of modification without departing from the inventive concept and right is herein reserved to such modifications as fall within the scope of the subjoined claim.

What I claim is:

In a machine of the class described, a wheel supported axle, a beam extending along said axle, a battery of cutting blades, means to mount said blades on said beam to trail behind the same and for adjustment into and out of the ground comprising a battery of blade carrying arms hinged at one end to the rear of said beam for vertical swinging movement in laterally spaced relation, a pair of links hinged to said beam for vertical swinging movement above said battery of arms and adjacent to opposite ends of said battery of arms, a cross bar connecting the free ends of said links, an upwardly yielding connection between each arm and said bar, a hand lever on said beam swingable into different set positions, and an operating connection between said lever and bar yielding in the direction of said lever.

OSCAR H. OLSON.